United States Patent [19]

Shimizu et al.

[11] Patent Number: 5,764,421
[45] Date of Patent: Jun. 9, 1998

[54] ZOOM LENS SYSTEM HAVING MINIMAL ABERRATION FLUCTUATION AT SHORT OBJECT DISTANCE

[75] Inventors: Seiji Shimizu; Tatsuru Kanamori, both of Tokyo, Japan

[73] Assignee: Olympus Optical Co., Ltd., Tokyo, Japan

[21] Appl. No.: 155,739

[22] Filed: Nov. 22, 1993

[30] Foreign Application Priority Data

Nov. 20, 1992 [JP] Japan ................... 4-311704

[51] Int. Cl.$^6$ ................... G02B 15/14
[52] U.S. Cl. ................... 359/689; 359/683; 359/684
[58] Field of Search ................... 359/689, 686, 359/684, 682, 681, 683

[56] References Cited

U.S. PATENT DOCUMENTS

| | | | |
|---|---|---|---|
| 4,702,567 | 10/1987 | Kato et al. | 359/684 |
| 4,726,667 | 2/1988 | Tachihara | 359/681 |
| 5,002,373 | 3/1991 | Yamanashi | 359/389 |
| 5,111,338 | 5/1992 | Nakayama | 359/686 |
| 5,270,865 | 12/1993 | Kikuchi et al. | 359/686 |
| 5,276,553 | 1/1994 | Tatsuno | 359/686 |

FOREIGN PATENT DOCUMENTS 2136811  5/1990  Japan.
2201409  8/1990  Japan.

*Primary Examiner*—Georgia Y. Epps
*Assistant Examiner*—Jordan M. Schwartz
*Attorney, Agent, or Firm*—Cushman Darby & Cushman IP Group of Pillsbury Madison & Sutro LLP

[57] ABSTRACT

A zoom lens system having three lens units, that is, a negative lens unit, a positive lens unit, and a negative lens unit. The idea of floating system is introduced into the rear focusing system to minimize the degree of aberration fluctuation at a short object distance with a simple lens arrangement, thereby stabilizing the optical performance during focusing at a short object distance. The zoom lens system includes a 1-st lens unit (G1) having a negative refractive power, a 2-nd lens unit (G2) having a positive refractive power, and a 3-rd lens unit (G3) having a negative refractive power, and effects zooming from the wide end to the tele end by varying the spacing between each pair of adjacent lens units. With the 2-nd lens unit (G2) defined as a focusing lens unit, focusing is effected by varying the axial air spacing between a lens component ($L_F$) of the 2-nd lens unit (G2) that is the closest to the image side and the remaining lens component ($L_F'$).

17 Claims, 9 Drawing Sheets

FIG. IA
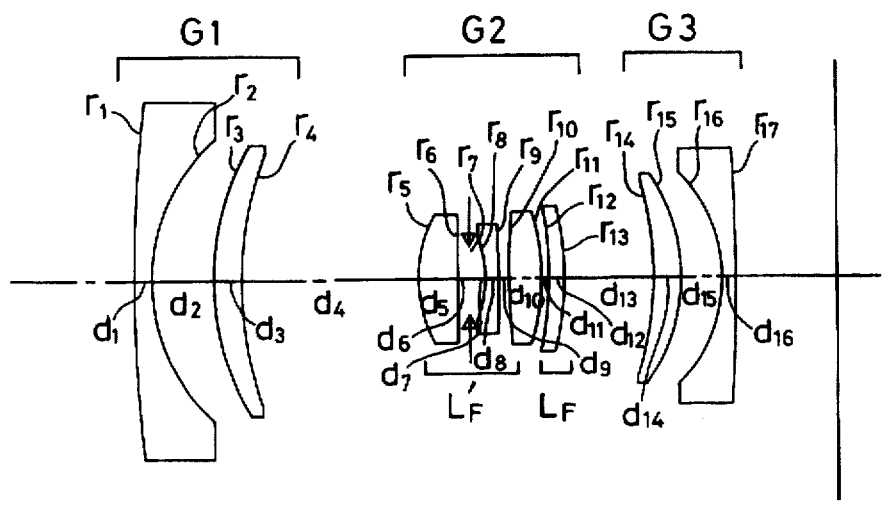
FIG. IB
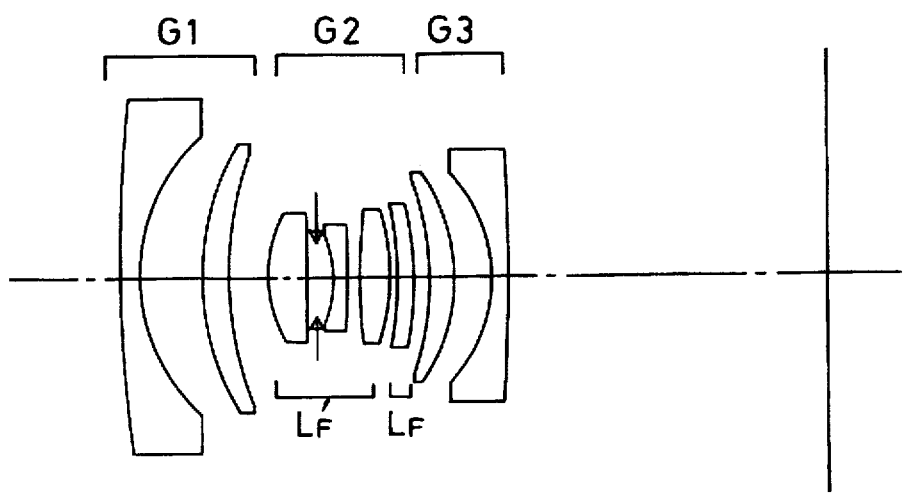

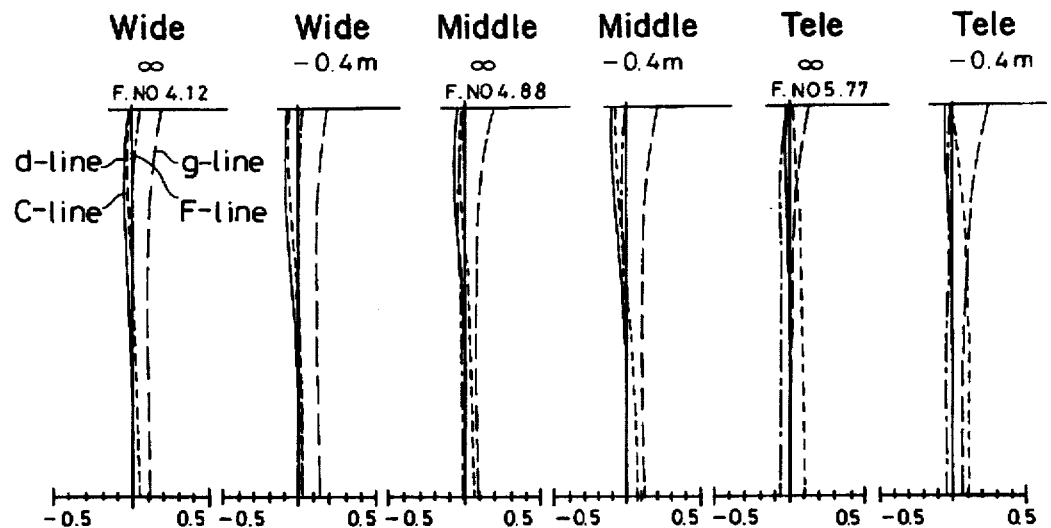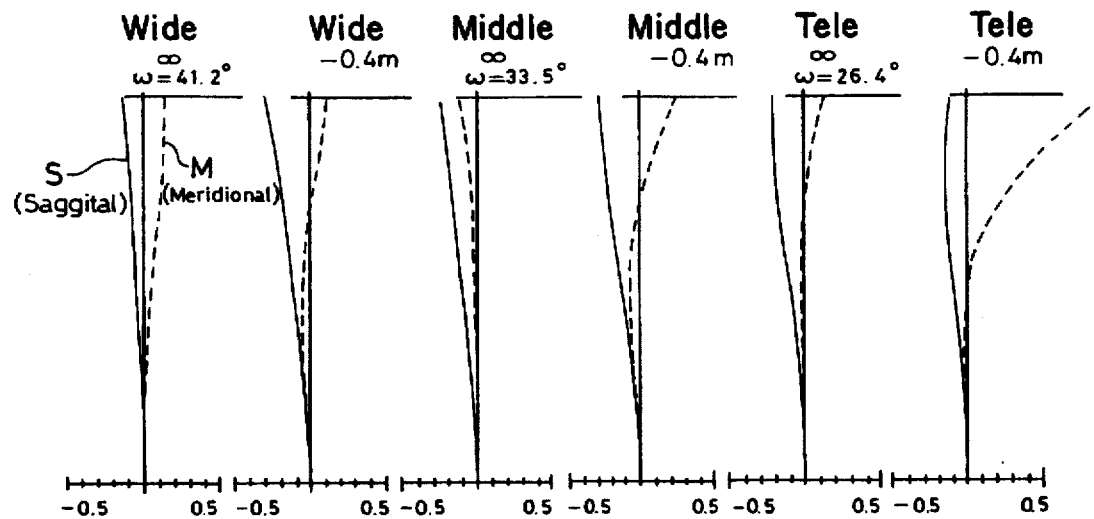

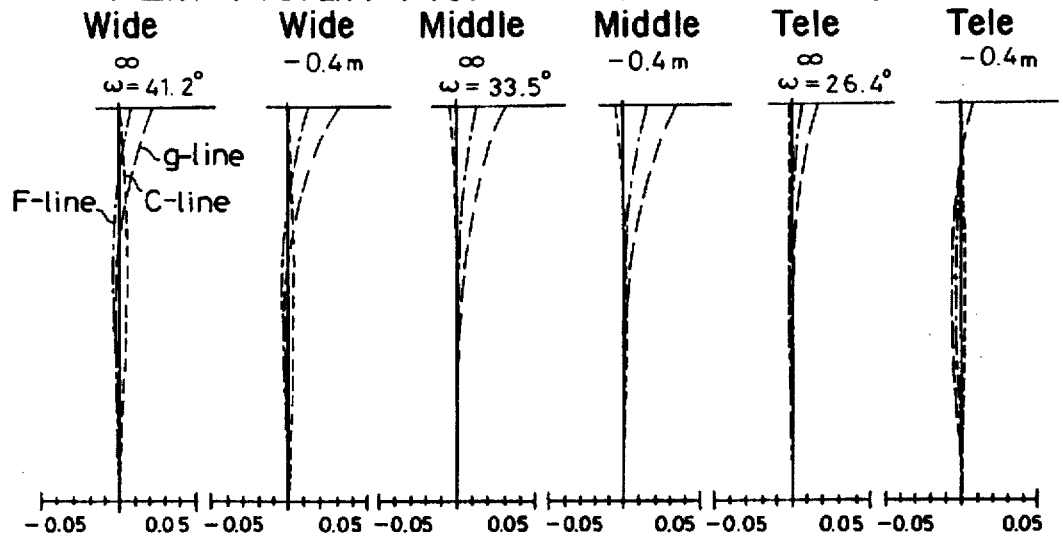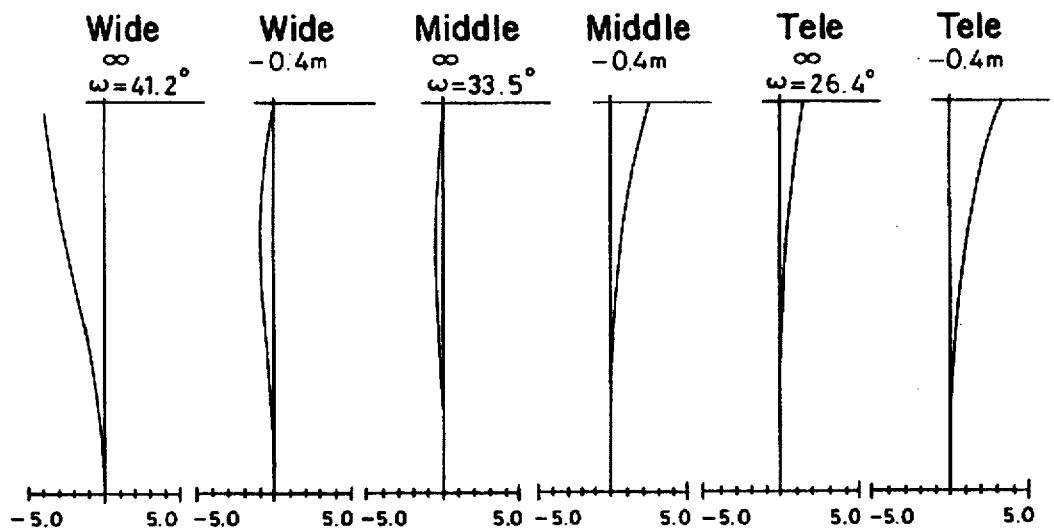

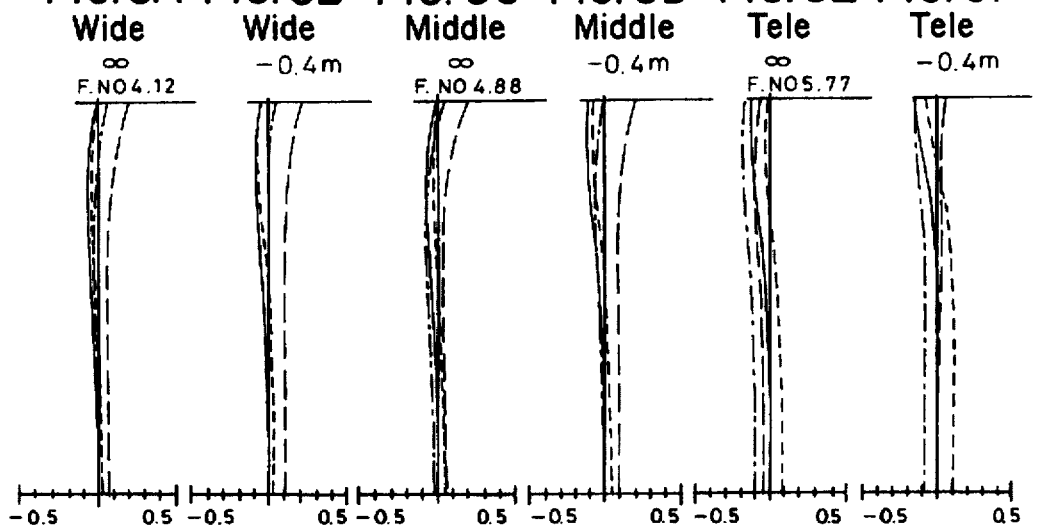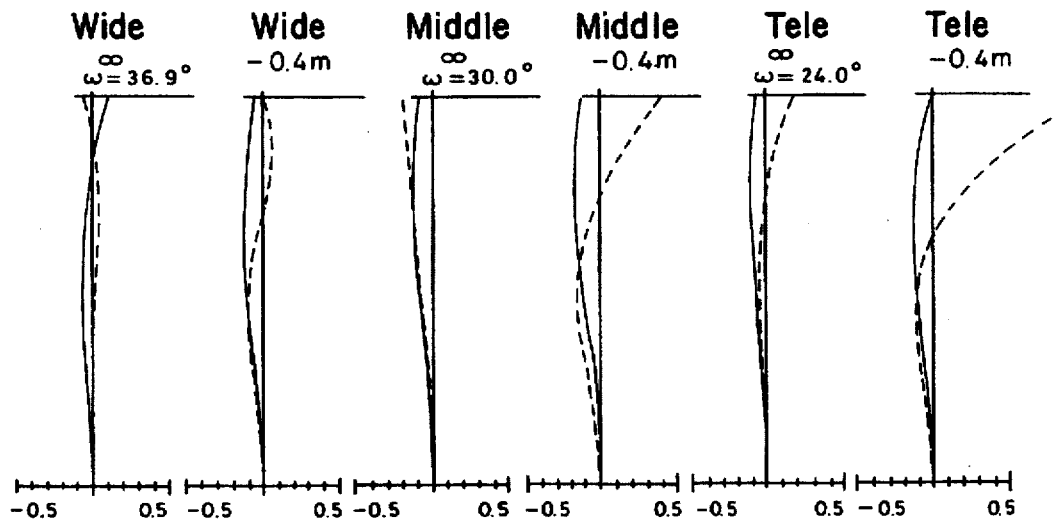

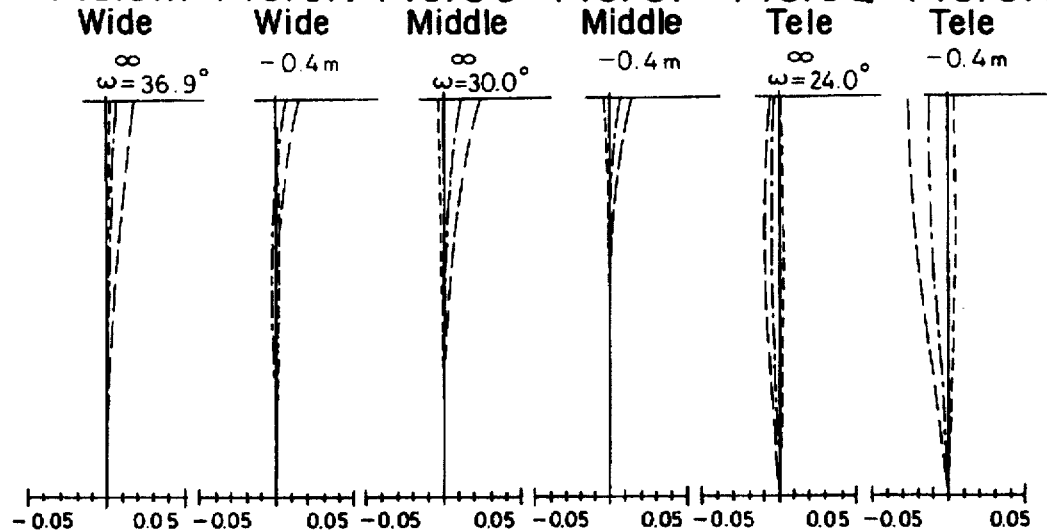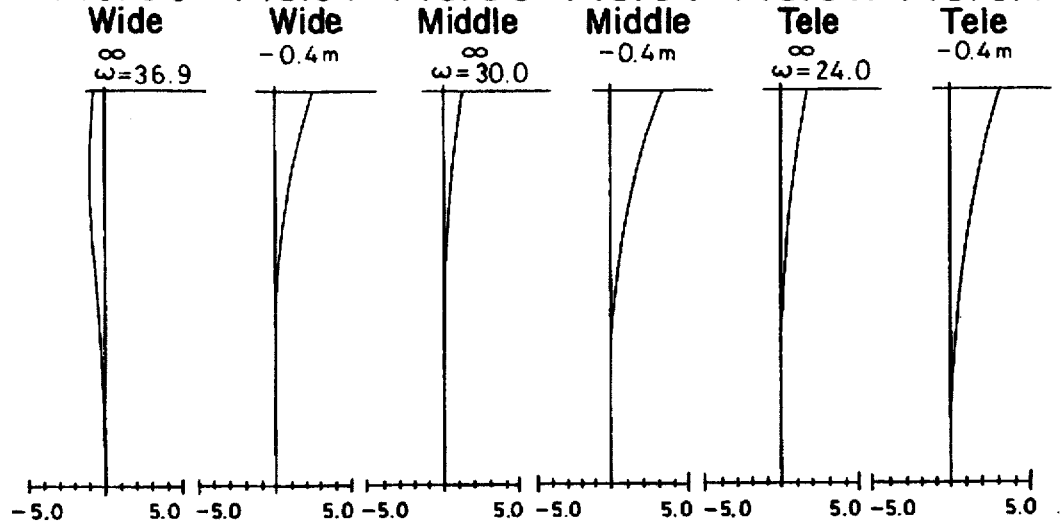

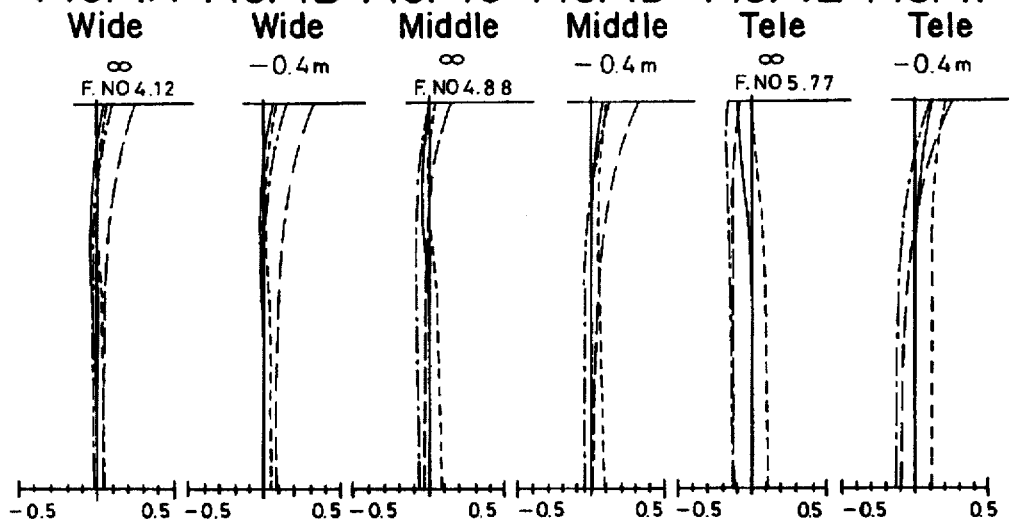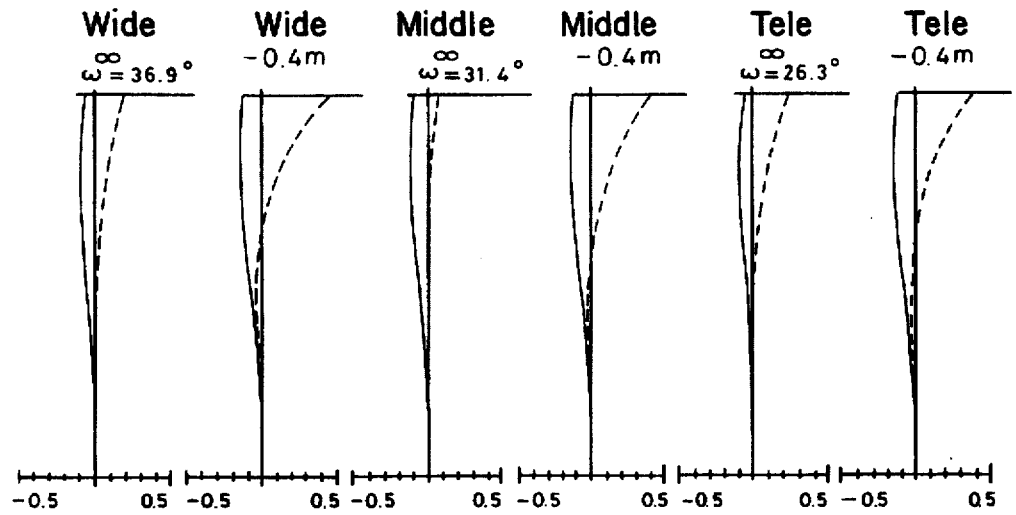

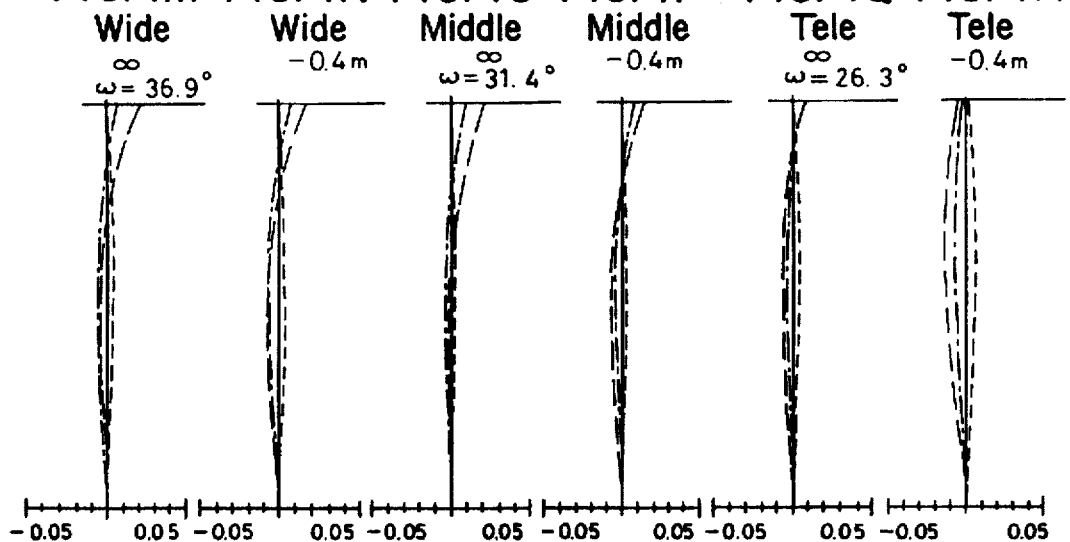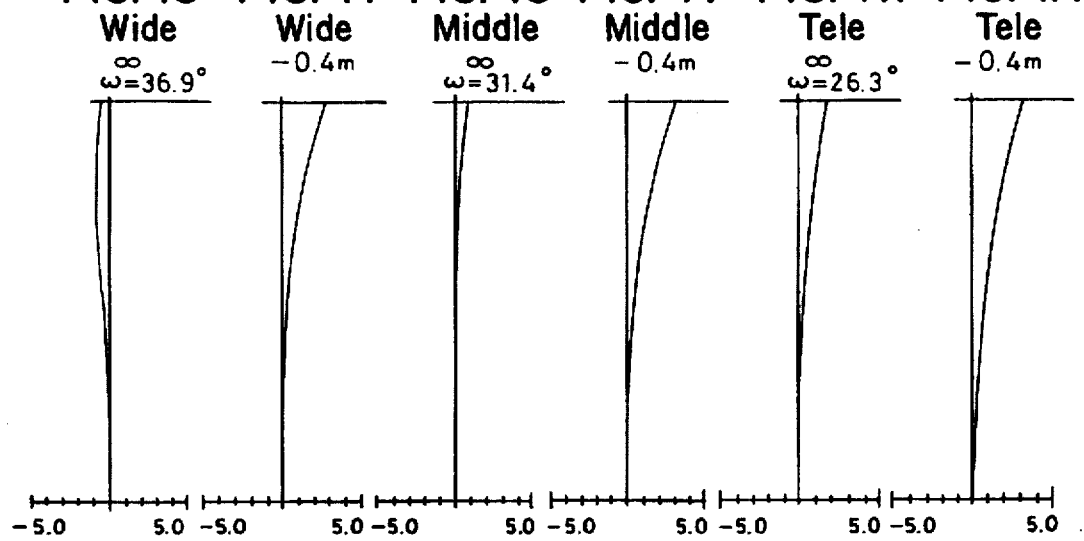

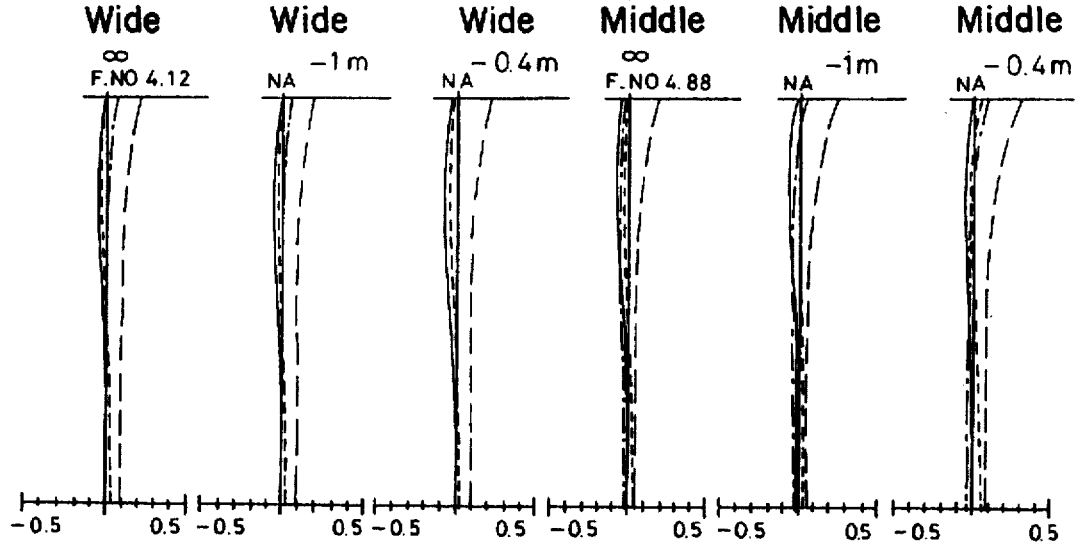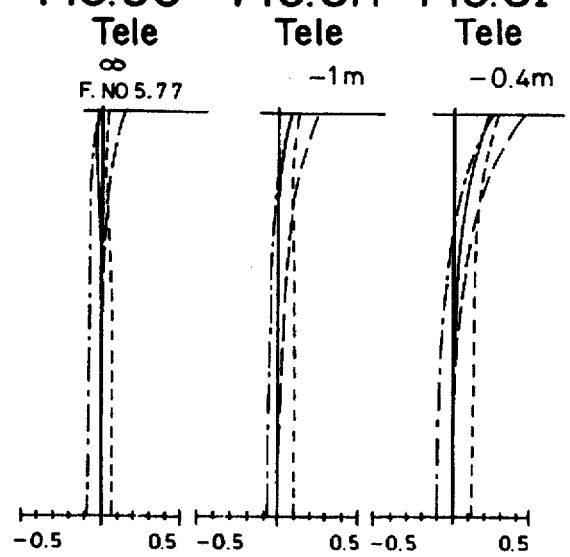

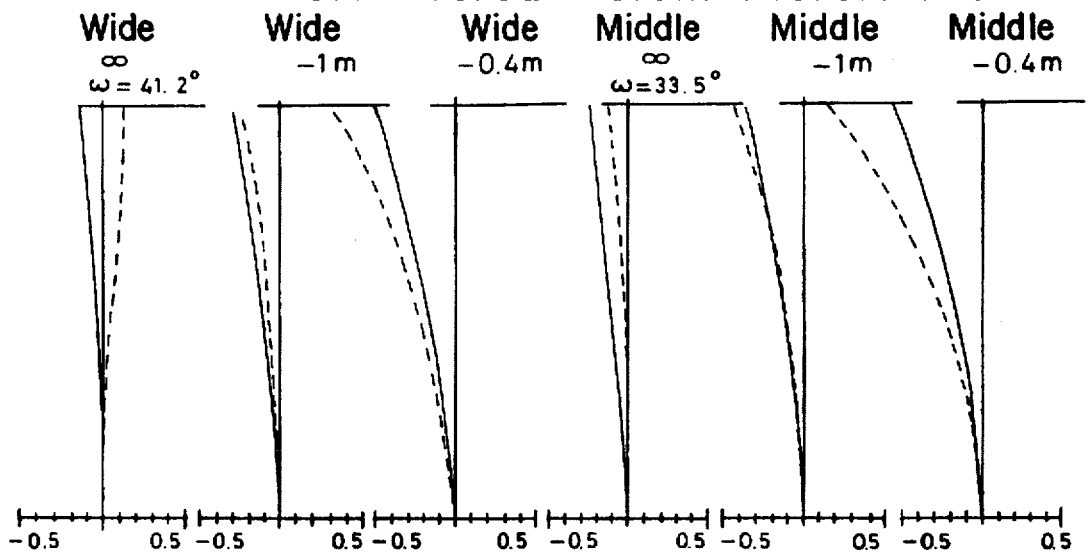
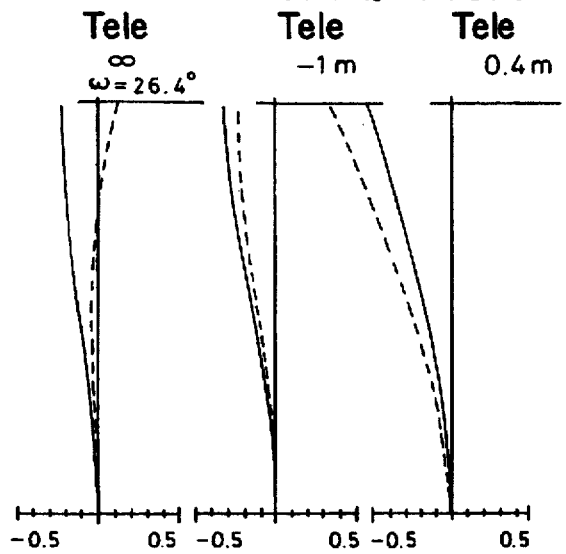

ZOOM LENS SYSTEM HAVING MINIMAL ABERRATION FLUCTUATION AT SHORT OBJECT DISTANCE

BACKGROUND OF THE INVENTION

The present invention relates to zoom lens systems and, more particularly, to a zoom lens system which is designed so that it is possible to focus on an object point at a short distance with minimal aberration fluctuation and hence possible to shorten the closest focusing distance.

Zoom lens systems used with photographic cameras include a three-unit type zoom lens system which is composed of three lens units, that is, a negative lens unit, a positive lens unit, and a negative lens unit. There have heretofore been proposed three-unit type zoom lens systems that employ rear focusing system in which focusing is effected by moving a lens unit other than the first lens unit. For example, see Japanese Patent Application Laid-Open (KOKAI) Nos. 02-201409 (1990) and 02-136811 (1990).

However, the zoom lens system disclosed in Japanese Patent Application Laid-Open (KOKAI) No. 02-201409 (1990) already shows that at short object distances of about one meter astigmatism (at the wide end) and spherical aberration (at the tele end) shift toward the under side to a considerable extent. If it is intended to further shorten the closest focusing distance, the optical performance deteriorates extremely, and no satisfactory performance can be obtained. In the zoom lens system disclosed in Japanese Patent Application Laid-Open (KOKAI) No. 02-136811 (1990), focusing is effected by moving the second lens unit. However, at the tele end where the amount of lens movement for focusing is large, adequate focusing cannot be attained at an object distance shorter than about one meter. If it is intended to further shorten the closest focusing distance, the first and second lens units interfere with each other.

In general, zoom lens systems that employ a rear focusing system have the tendency that aberration fluctuation increases near the tele end when the amount of lens movement for focusing becomes large. However, under the present circumstances where there is a strong demand for the closest focusing distance to be further shortened, it is necessary to devise a focusing method which enables satisfactory optical performance to be ensured over the entire focusing range, from the infinite object point to the closest focusing distance.

SUMMARY OF THE INVENTION

In view of the above-described circumstances, it is an object of the present invention to provide a high-performance three-unit type zoom lens system which includes, in order from the object side, a first lens unit having a negative refractive power, a second lens unit having a positive refractive power, and a third lens unit having a negative refractive power, and which is designed so that the optical performance when focusing is effected at a short object distance by the rear focusing system is stabilized, and satisfactory performance is ensured over the entire focusing range, from the infinite object point to the closest focusing distance, thereby attaining the object which has heretofore been difficult to achieve with the conventional technique.

To attain the above-described object, the present invention provides a zoom lens system having minimal aberration fluctuation at a short object distance, which includes, in order from the object side, a first lens unit having a negative refractive power, a second lens unit having a positive refractive power, and a third lens unit having a negative refractive power, and which effects zooming from the wide end to the tele end by varying the spacing between each pair of adjacent lens units. The second lens unit includes a plurality of sub lens units (hereinafter also referred to as "lens components" so that focusing is effected by varying the axial spacing between the sub lens unit in the second lens unit that is the closest to the image side and the other sub lens unit(s).

In this case, it is preferable that when focusing is effected at a short object distance, the sub lens unit in the second lens unit that is the closest to the image side should be fixed, and the sub lens unit(s) other than the image-side sub lens unit should be moved toward the object side. In addition, it is preferable to satisfy the following condition:

$$|\phi_{LF}/\phi_2| < 1.0 \qquad (1)$$

where $\phi_{LF}$ is the power of the sub lens unit in the second lens unit that is the closest to the image side, and $\phi_2$ is the power of the second lens unit.

In addition, the present invention provides a zoom lens system having minimal aberration fluctuation at a short object distance, which has three lens units and changes the focal length of the entire system by varying the spacing between each pair of adjacent lens units. The second lens unit, which is the middle lens unit among the three lens units, has a plurality of sub lens units. The spacing between the sub lens unit in the second lens units that is the closest to the image side and the sub lens unit(s) other than it is variable so that focusing is effected by varying the variable spacing.

In this case, it is preferable that the second lens unit should have a positive power, and the lens units in front and at the back of the second lens unit should each have a negative power. In addition, it is preferable that when focusing is effected at a short object distance, the sub lens unit in the second lens unit that is the closest to the image side should be fixed on the optical axis, and the sub lens unit(s) in the second lens unit other than the image-side sub lens unit should move toward the object side.

In this case also, it is preferable to satisfy the following condition:

$$|\phi_{LF}/\phi_2| < 1.0 \qquad (1)$$

where $\phi_{LF}$ is the power of the sub lens unit in the second lens unit that is the closest to the image side, and $\phi_2$ is the power of the second lens unit.

Further, the sub lens unit in the second lens unit that is the closest to the image side is preferably formed from a meniscus lens having a convex surface directed toward the image side. The arrangement may be such that an object-side lens unit of the second lens unit includes a negative and positive lens each having a convex surface directed toward the object side, and an image side lens unit of the second lenses unit includes a positive and negative lenses each having a convex surface directed toward the image side.

The arrangement may also be such that the second lens unit includes a first sub lens unit which includes a positive lens, a negative lens, and a positive lens and which has a positive power as a whole, and a second sub lens unit which is disposed at the image side of the first sub lens unit, and that when focusing is effected, the spacing between the first and second sub lens units varies.

Further, the first sub lens unit may include an aperture stop.

The reason for adopting the above-described arrangements and the functions thereof will be explained below.

The present invention aims principally at suppressing the fluctuation of the spherical aberration and astigmatism caused by focusing to thereby attain shortening of the closest focusing distance, which will be increasingly in demand in the future.

To accomplish the purpose, the present invention introduces the idea of floating system into the rear focusing system to minimize the degree of aberration fluctuation with a simple lens arrangement, thereby stabilizing the optical performance.

The basic focusing method in the present invention is that in a three-unit zoom lens system having a negative lens unit G1, a positive lens unit G2, and a negative lens unit G3, as shown in FIGS. 1A and 1B, the system is focused on a short-distance object point by moving the whole second lens unit G2 toward the object side.

With this method, aberration fluctuation is not very large at an object distance not shorter than about one meter. However, if the closest focusing distance is further shortened to 0.4 m, it is impossible to obtain short-distance performance (in terms of the fluctuation of aberrations, particularly astigmatism) adequate to lead the zoom lens system to a practical product level. This will be quite obvious, for example, from FIGS. 5A–5R, which graphically show in a comparative manner spherical aberration, FIGS. 5A–5I, and astigmatism, FIGS. 5J–5R, at the wide end, the middle focal length position, and the tele end with respect to the infinite object point, a short object distance of one meter, and a short object distance of 0.4 m in a case where the conventional focusing method is adopted for Example 1, which will be described later. Accordingly, it is necessary to devise a scheme to minimize the aberration fluctuation.

Therefore, according to the present invention, in a three-unit type zoom lens system having power distribution as shown in FIGS. 1A and 1B, the second lens unit G2, which serves as a focusing lens unit, includes a lens component $L_F$ having a relatively small power, which is disposed at a position in the second lens unit G2 that is closest to the image side, and focusing is effected by varying the axial air spacing between the lens component $L_F$ and the remaining lens component $L_F'$ of the second lens unit G2, thereby obtaining the effectiveness of the floating system. In this case, the lens component $L_F$ functions to correct the flatness of the image surface. For this purpose, it is preferable that the lens component $L_F$ functions to correct the flatness of the image surface. For this purpose, it is preferable for the lens component $L_F$ to have a meniscus configuration which is convex toward the image side.

The effectiveness of the above-described focusing method will be clear from the graphs showing aberrations in each example of the present invention, which will be described later. Incidentally, FIGS. 2A–2F and 5A–5R graphically show aberrations measured for the focusing method of the present invention and the conventional focusing method with respect to the same lens data in Example 1. The effectiveness of the focusing method according to the present invention will become clear from the comparison between the two methods.

The lens component $L_F$ of the second lens unit G2 that is disposed closest to the image side may be either movable or fixed during focusing. From the viewpoint of production, it is preferable that focusing should be effected by moving the lens component $L_F'$ with the lens component $L_F$ fixed.

The power $\phi_{LF}$ of the lens component $L_F$ is preferably set within the following range:

$$|\phi_{LF}/\phi_2| < 1.0 \quad (1)$$

where $\phi_2$ is the refractive power of the second lens unit G2.

If the power $\phi_{LF}$ fails to satisfy the condition (1) and $|\phi_{LF}/\phi_2|$ is not smaller than 1.0, the fluctuation of spherical aberration caused by focusing becomes large particularly at the tele end, so that it is difficult to ensure stable performance for short object distance.

Although in the examples of the present invention the lens component $L_F$ has a single lens element, it may be comprised of a cemented lens or a group of a plurality of lens elements as long as the composite refractive power satisfies the condition (1). However, the overall length of the lens system increases as a result of the increase in the number of lens elements used. Therefore, the alternative arrangement is not preferable. The lens component $L_F$ can exhibit its full effectiveness with a single lens element.

Thus, it is possible according to the present invention to improve the drawback of the conventional zoom lens system that the performance is good for an object point at a long distance, but it markedly deteriorates for an object point at a short distance.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1A and 1B are sectional views showing a zoom lens system of Example 1 of the present invention at the wide end (a) and also at the tele end (b).

FIGS. 2A–2L graphically show in a comparative manner spherical aberration, FIGS. 2A–2F, and astigmatism, FIGS. 2G–2L, at the wide end, the middle focal length position, and the tele end with respect to an infinite object point and a short object distance of 0.4 m in Example 1.

FIGS. 2M–2X graphically show in a comparative manner lateral chromatic aberration, FIGS. 2M–2R, and distortion, FIGS. 2R–2X, at the wide end, the middle focal length position, and the tele end with respect to the infinite object point and a short object distance of 0.4 m in Example 1.

FIGS. 3A–3L graphically show aberrations in Example 2 in a similar manner to FIGS. 2A–2L.

FIGS. 3M–3X graphically show aberrations in Example 2 in a similar manner to 2M–2X.

FIGS. 4A–4L graphically show aberrations in Example 3 in a similar manner to FIGS. 2A–2L.

FIGS. 4M–4X graphically show aberrations in Example 3 in a similar manner to FIG. 2M–2X.

FIGS. 5A–5I graphically show in a comparative manner spherical aberration at the wide end, the middle focal length position, and the tele end with respect to the infinite object point, a short object distance of one meter, and a short distance of 0.4 m in a case where the conventional focusing method is adopted for Example 1.

FIGS. 5J–5R graphically show in a comparative manner astigmatism at the wide end, the middle focal length position, and the tele end with respect to the infinite object point, a short object distance of 1 m, and a short object distance of 0.4 m in a case where the conventional focusing method is adopted for Example 1.

DESCRIPTION OF THE PREFERRED EMBODIMENTS

Examples 1 to 3 of the zoom lens system according to the present invention will be described below.

Lens data in Examples 1 to 3 will be described later. Example 1 is a wide-angle zoom lens system having a focal length ranging from 24.7 mm to 43.6 mm. The zoom lens system is of the three-unit type which has three lens units, i.e., a first lens unit G1 to a third lens unit G3, as shown in the sectional view of FIGS. 1A and 1B, which show the zoom lens system at the wide end, FIG. 1A, and also at the tele end, FIG. 1B. In the second lens unit G2, a lens component $L_F$ that is closest to the image side is provided for the purpose of suppressing aberration fluctuation occurring during focusing. The lens component $L_F'$ in the second lens unit G2 other than the lens unit $L_F$ is moved during focusing, thereby making it possible to focus the system on an object point at a short distance. In this case, the focal length $f_{LF}$ of the lens component $L_F$ is 179.955.

With regard to the lens arrangement, the first lens unit G1 includes a negative meniscus lens having a convex surface directed toward the object side, and a positive meniscus lens having a convex surface directed toward the object side. The first-half $L_F'$ of the second lens unit G2 includes a double-convex lens, an aperture stop, a negative meniscus lens having a convex surface directed toward the image side, and a double-convex lens. The latter half $L_F$ of the second lens unit G2 has a single positive meniscus lens having a convex surface directed toward the image side. The third lens unit G3 includes a positive meniscus lens having a convex surface directed toward the image side, and a negative meniscus lens having a convex surface directed toward the image side. In addition, an aspherical surface is employed to constitute each of the 5-th, 11-th and 13-th lens surfaces from the object side.

FIGS. 2A–2X graphically show in a comparative manner spherical aberration FIGS. 2A–2F, astigmatism, FIGS. 2G–2L, lateral chromatic aberration, FIGS. 2M–2R, and distortion, FIGS. 2S–2X, at the wide end, the middle focal length position, and the tele end with respect to the infinite object point and a short object distance of 0.4 m in this example. As will be understood from the graphs, the aberration fluctuation is extremely small over the focusing range, from the infinite object point to the closest focusing distance (0.4 m). Thus, favorable optical performance is stably maintained over the entire focusing range.

Example 2 is a zoom lens system having a focal length ranging from 28.8 mm to 48.5 mm. The lens unit arrangement of the lens system and the focusing method are the same as those in Example 1. As to the lens arrangement (not shown), the first lens unit includes a negative meniscus lens having a convex surface directed toward the object side, and a positive meniscus lens having a convex surface directed toward the object side. The first half $L_F'$ of the second lens unit includes a positive meniscus lens having a convex surface directed toward the object side, an aperture stop, a double-concave lens, and a double-convex lens. The latter half $L_F$ of the second lens unit has a single positive meniscus lens having a convex surface directed toward the image side. The third lens unit includes a positive meniscus lens having a convex surface directed toward the image side, and a negative meniscus lens having a convex surface directed toward the image side. In addition, an aspherical surface is employed to constitute each of the fifth, eleventh and thirteenth lens surfaces from the object side. FIGS. 3A–3X graphically show aberrations in this example in a similar manner to FIGS. 2A–2X. In this case, the focal length $f_{LF}$ is 129.343. As will be clear from the graphs, the aberration fluctuation is extremely small, and thus favorable optical performance is stably maintained.

Example 3 is a zoom lens system having a focal length ranging from 28.8 mm to 43.6 mm. The lens unit arrangement of the lens system is the same as that in Example 1. With regard to the focusing method, the system is focused on an object point at a short distance by moving the lens component $L_F'$ in the second lens unit other than the lens component $L_F$ and, at the same time, slightly moving the lens component $L_F$ toward the image side. However, at the tele end, the lens component $L_F$ is intentionally made immovable during focusing because if it is moved toward the image side during focusing at the tele end, the lens component $L_F$ may interfere with the third lens unit. As to the lens arrangement (not shown), the first lens unit includes a negative meniscus lens having a convex surface directed toward the object side, and a positive meniscus lens having a convex surface directed toward the object side. The first half $L_F'$ of the second lens unit includes a double-convex lens, an aperture stop, a negative meniscus lens having a convex surface directed toward the image side, and a double-convex lens. The latter half $L_F$ of the second lens unit has a single positive meniscus lens having a convex surface directed toward the image side. The third lens unit includes a positive meniscus lens having a convex surface directed toward the image side, and a negative meniscus lens having a convex surface directed toward the image side. In addition, an aspherical surface is employed to constitute each of the fifth, eleventh and thirteenth lens surfaces from the object side. FIGS. 4A–4X graphically show aberrations in this example in a similar manner to FIGS. 2A–2X. In this case, the focal length $f_{LF}$ is 167.792. As will be clear from the graphs, the aberration fluctuation is extremely small, and thus favorable optical performance is stably maintained.

Lens data in each Example will be shown below. In the following, reference symbol f denotes the focal length of the entire system, $F_{NO}$ is F-number, $\omega$ is the half view angle, $f_B$ is the back focus (the distance from the final lens surface to the image surface when the system is focused on the infinite object point), $r_1, r_2 \ldots$ are the curvature radii of lens surfaces, $d_1, d_2 \ldots$ are the spacings between adjacent lens surfaces, $n_{d1}, n_{d2} \ldots$ are the refractive indices of the lenses for the spectral d-line, and $\gamma_{d2} \ldots$ are the Abbe numbers of the lenses. Assuming that the direction of the optical axis is x and a direction perpendicular to the optical axis is y, the aspherical configuration is expressed by $$X = (y^2/R)/\{1+(1-Y^2/R^2)^{1/2}\} A_4 Y^4 + A_6 Y^6 + A_8 Y^8 \ldots$$

where r is the curvature radius on the optical axis, and $A_4$, $A_6$, $A_8$ and $A_{10}$ are aspherical coefficients. It should be noted that the values in the parentheses in tables showing zooming spacings in Examples are air spacings when the system is focused on an object point at a short distance (0.4 m).

| Example 1 | | | |
|---|---|---|---|
| f = 24.7~32.7~43.6 | | | |
| $F_{NO}$ = 4.12~4.88~5.77 | | | |
| $\omega$ = 41.2°~33.5°~26.4° | | | |
| $f_B$ = 10.296~20.507~30.886 | | | |
| $r_1$ = 152.1416 | $d_1$ = 1.800 | $n_{d1}$ = 1.61720 | $v_{d1}$ = 54.04 |
| $r_2$ = 18.8142 | $d_2$ = 5.815 | | |
| $r_3$ = 24.3471 | $d_3$ = 3.100 | $n_{d2}$ = 1.84666 | $v_{d2}$ = 23.78 |
| $r_4$ = 35.6336 | $d_4$ = (Variable) | | |
| $r_5$ = 12.6070 (Aspheric) | $d_5$ = 3.928 | $n_{d3}$ = 1.56873 | $v_{d3}$ = 63.16 |
| $r_6$ = −538.1373 | $d_6$ = 0.984 | | |
| $r_7$ = ∞ (Stop) | $d_7$ = 1.500 | | |
| $r_8$ = −12.8887 | $d_8$ = 1.484 | $n_{d4}$ = 1.75550 | $v_{d4}$ = 25.07 |
| $r_9$ = −213.5174 | $d_9$ = 1.051 | | |
| $r_{10}$ = 59.5886 | $d_{10}$ = 3.415 | $n_{d5}$ = 1.67790 | $v_{d5}$ = 55.33 |

-continued

| | | | |
|---|---|---|---|
| $r_{11} = -16.9057$ (Aspheric) | $d_{11} = 0.500$ | | |
| $r_{12} = -35.2664$ | $d_{12} = 1.493$ | $n_{d6} = 1.78800$ | $v_{d6} = 47.38$ |
| $r_{13} = -28.7694$ (Aspheric) | $d_{13} = $ (Variable) | | |
| $r_{14} = -27.6818$ | $d_{14} = 2.600$ | $n_{d7} = 1.84666$ | $v_{d7} = 23.78$ |
| $r_{15} = -17.6220$ | $d_{15} = 3.378$ | | |
| $r_{16} = -15.8119$ | $d_{16} = 1.480$ | $n_{d8} = 1.81600$ | $v_{d8} = 46.62$ |
| $r_{17} = -305.6022$ | | | |

Zooming Spaces

| f | 24.7 | 32.7 | 43.6 |
|---|---|---|---|
| $d_4$ | 17.0576(15.473) | 11.3276(9.353) | 3.5774(0.745) |
| $d_{13}$ | 8.5961 | 4.1328 | 1.5053 |

Aspherical Coefficients

5th surface $A_4 = 0.39123 \times 10^{-4}$
$A_6 = 0.63965 \times 10^{-6}$
$A_8 = 0.10293 \times 10^{-7}$ 11th surface $A_4 = 0.99357 \times 10^{-4}$
$A_6 = 0.46137 \times 10^{-6}$
$A_8 = 0.41321 \times 10^{-8}$ 13th surface $A_4 = 0.99122 \times 10^{-5}$
$A_6 = 0.18140 \times 10^{-6}$
$A_8 = -0.96560 \times 10^{-9}$
$\phi_{LF}/\phi_2 = 0.123$ Example 2

$f = 28.8 \sim 37.4 \sim 48.5$
$F_{NO} = 4.12 \sim 4.88 \sim 5.77$
$\omega = 36.9° \sim 30.0° \sim 24.0°$
$f_B = 12.022 \sim 22.232 \sim 33.069$

| | | | |
|---|---|---|---|
| $r_1 = 84.4521$ | $d_1 = 1.800$ | $n_{d1} = 1.46450$ | $v_{d1} = 65.94$ |
| $r_2 = 18.5223$ | $d_2 = 5.855$ | | |
| $r_3 = 23.3072$ | $d_3 = 3.100$ | $n_{d2} = 1.84666$ | $v_{d2} = 23.78$ |
| $r_4 = 29.8295$ | $d_4 = $ (Variable) | | |
| $r_5 = 13.9876$ (Aspheric) | $d_5 = 2.319$ | $n_{d3} = 1.58313$ | $v_{d3} = 59.36$ |
| $r_6 = 138.5307$ | $d_6 = 0.984$ | | |
| $r_7 = \infty$ (Stop) | $d_7 = 1.500$ | | |
| $r_8 = -16.9663$ | $d_8 = 0.989$ | $n_{d4} = 1.75550$ | $v_{d4} = 25.07$ |
| $r_9 = 82.1808$ | $d_9 = 2.200$ | | |
| $r_{10} = 31.7916$ | $d_{10} = 3.595$ | $n_{d5} = 1.67790$ | $v_{d5} = 55.33$ |
| $r_{11} = -20.6014$ (Aspheric) | $d_{11} = 0.500$ | | |
| $r_{12} = -30.2316$ | $d_{12} = 1.493$ | $n_{d6} = 1.78800$ | $v_{d6} = 47.38$ |
| $r_{13} = -23.8231$ (Aspheric) | $d_{13} = $ (Variable) | | |
| $r_{14} = -26.3239$ | $d_{14} = 2.600$ | $n_{d7} = 1.79850$ | $v_{d7} = 22.60$ |
| $r_{15} = -17.3570$ | $d_{15} = 3.580$ | | |
| $r_{16} = -16.2542$ | $d_{16} = 1.480$ | $n_{d8} = 1.81600$ | $v_{d8} = 46.62$ |
| $r_{17} = -1883.4051$ | | | |

Zooming Spaces

| f | 28.8 | 37.4 | 48.5 |
|---|---|---|---|
| $d_4$ | 17.8654(15.863) | 11.7716(9.446) | 3.7000(0.795) |
| $d_{13}$ | 8.7190 | 4.6207 | 1.8759 |

Aspherical Coefficients

5th surface $A_4 = 0.32894 \times 10^{-4}$
$A_6 = 0.42075 \times 10^{-6}$
$A_8 = 0.58006 \times 10^{-8}$ 11th surface $A_4 = 0.81600 \times 10^{-4}$
$A_6 = 0.35520 \times 10^{-7}$
$A_8 = 0.30962 \times 10^{-8}$ 13th surface $A_4 = 0.11498 \times 10^{-4}$
$A_6 = 0.27830 \times 10^{-6}$ -continued $A_8 = -0.16181 \times 10^{-8}$
$\phi_{LF}/\phi_2 = 0.177$ Example 3

$f = 28.8 \sim 35.4 \sim 43.6$
$F_{NO} = 4.12 \sim 4.88 \sim 5.77$
$\omega = 36.9° \sim 31.4° \sim 26.3°$
$f_B = 13.039 \sim 21.753 \sim 30.706$

| | | | |
|---|---|---|---|
| $r_1 = 283.8916$ | $d_1 = 1.800$ | $n_{d1} = 1.51742$ | $v_{d1} = 52.41$ |
| $r_2 = 20.0667$ | $d_2 = 5.863$ | | |
| $r_3 = 26.7692$ | $d_3 = 3.100$ | $n_{d2} = 1.84666$ | $v_{d2} = 23.78$ |
| $r_4 = 39.4311$ | $d_4 = $ (Variable) | | |
| $r_5 = 13.1273$ (Aspheric) | $d_5 = 3.797$ | $n_{d3} = 1.58313$ | $v_{d3} = 59.36$ |
| $r_6 = -15942.0717$ | $d_6 = 0.984$ | | |
| $r_7 = \infty$ (Stop) | $d_7 = 1.500$ | | |
| $r_8 = -12.9362$ | $d_8 = 1.469$ | $n_{d4} = 1.75550$ | $v_{d4} = 25.07$ |
| $r_9 = -171.2007$ | $d_9 = 1.129$ | | |
| $r_{10} = 101.1493$ | $d_{10} = 3.363$ | $n_{d5} = 1.69100$ | $v_{d5} = 54.84$ |
| $r_{11} = -16.9574$ (Aspheric) | $d_{11} = 0.500$ | | |
| $r_{12} = -37.5345$ | $d_{12} = 1.493$ | $n_{d6} = 1.80400$ | $v_{d6} = 46.57$ |
| $r_{13} = -29.8849$ (Aspheric) | $d_{13} = $ (Variable) | | |
| $r_{14} = -27.3929$ | $d_{14} = 2.600$ | $n_{d7} = 1.84666$ | $v_{d7} = 23.78$ |
| $r_{15} = -17.4501$ | $d_{15} = 3.255$ | | |
| $r_{16} = -15.8080$ | $d_{16} = 1.480$ | $n_{d8} = 1.80400$ | $v_{d8} = 46.57$ |
| $r_{17} = -174.6693$ | | | |

Zooming Spaces

| f | 28.8 | 35.4 | 43.6 |
|---|---|---|---|
| $d_4$ | 15.5065(13.4534) | 10.7213(8.3277) | 4.5945(1.6257) |
| $d_{13}$ | 8.1643(7.4718) | 4.3095(3.7152) | 1.5740(1.5740) |
| $d_{11}$ | (3.2692) | (3.4981) | (3.4691) |

Aspherical Coefficients

5th surface $A_4 = 0.42844 \times 10^{-4}$
$A_6 = 0.64160 \times 10^{-6}$
$A_8 = 0.10302 \times 10^{-7}$ 11th surface $A_4 = 0.87603 \times 10^{-4}$
$A_6 = 0.57262 \times 10^{-6}$
$A_8 = 0.32542 \times 10^{-8}$ 13th surface $A_4 = 0.72383 \times 10^{-5}$
$A_6 = 0.48583 \times 10^{-7}$
$A_8 = -0.56908 \times 10^{-11}$
$\phi_{LF}/\phi_2 = 0.140$ As described above, the present invention makes it possible to realize a zoom lens system having extremely stable performance over the entire focusing range, from the infinite object point to the closest focusing distance, by disposing the lens component $L_F$ in the conventional focusing lens unit at a position closest to the image side. In addition, one will immediately recognize from FIGS. 1A and 1B and the values of $d_4$, $d_{13}$ and $f_B$ presented in the above tables that the distance from the front end of the entire system, i.e., from the most object side lens surface, to the image plane remains substantially constant, even for different zoom positions. Although in the examples of the present invention aberration diagrams and tables are shown on the assumption that the closest focusing distance is 0.4 m, it should be noted that even if the closest focusing distance is further shortened, the aberration fluctuation is still extremely small. Thus, it is possible to improve the performance of zoom lens systems for photographic cameras, which as heretofore been said to be unacceptable at focusing on an object a short object away.

What we claim is:

1. A zoom lens system consisting of, in order from an object side;
   a first lens unit having a negative refractive power;
   second lens unit having a positive refractive power; and
   a third lens unit having a negative refractive power and being adapted to effect zooming from a wide end to a tele end by varying spacing between said first and second lens units and said second and third lens units,
   wherein said first lens unit includes, in order from the object side, a negative meniscus lens having a convex surface directed toward the object side, and a positive meniscus lens having a convex surface directed toward the object side,
   said second lens unit includes at least two lens components,
   focusing is effected by varying axial spacing between the lens component in said second lens unit that is closest to an image side of said zoom lens system and at least one other of said lens components,
   said third lens unit includes, in order from the object side, a positive meniscus lens having a convex surface directed toward the image side, and a negative meniscus lens having a convex surface directed toward the image side, and
   a distance from a most object side lens surface of the entire system to an image plane is substantially constant for any zoom position.

2. A zoom lens system according to claim 1, wherein when focusing is effected at a short object distance, the lens component in said second lens unit that is closest to the image side is fixed, and all the remainder of said lens components are movable toward the object side.

3. A zoom lens system according to claim 2, which satisfies the following condition:

$$|\phi_{LF}/\phi_2|<1.0 \quad (1)$$

where $\phi_{LF}$ is power of the lens component in said second lens unit that is closest to the image side, and $\phi_2$ is power of said second lens unit.

4. A zoom lens system comprising first, second and third lens units and being adapted to change a focal length of the entire system by varying spacing between said first and second and said second and third lens units,
   wherein said first lens unit includes, in order from an object side, a negative meniscus lens having a convex surface directed toward the object side, and a positive meniscus lens having a convex surface directed toward the object side,
   the second lens unit, which is disposed between said first and third lens units, has at least two lens components, wherein one of said lens components in said second lens unit is closest to an image side and is a meniscus lens having a convex surface directed toward the image side,
   a spacing between the lens component in said second lens unit that is closest to said image side of the zoom lens system and at least one other of said lens components is variable for focusing but the spacing is fixed when said focal length of the zoom lens system is changed,
   said third lens unit includes, in order from the object side, a positive meniscus lens having a convex surface directed toward the image side, and a negative meniscus lens having a convex surface directed toward the image side, and
   a distance from a most object side lens surface of the entire system to an image plane is substantially constant for any zoom position.

5. A zoom lens system according to claim 4, wherein said second lens unit has a positive power, and the first and third lens units each have a negative power.

6. A zoom lens system according to claim 5, wherein said second lens unit includes a first lens component which includes a positive lens, a negative lens, and a positive lens and which has a positive power as a whole, and a second lens component which is disposed at the image side of the first lens component, and
   when focusing is performed, the spacing between the first and second lens components varies.

7. A zoom lens system according to claim 6, wherein said first sub lens unit includes an aperture stop.

8. A zoom lens system according to claim 4, wherein said meniscus lens remains fixed during focusing, and said at least one other of said lens components moves toward an object side of said zoom lens system for focusing.

9. A zoom lens system according to claim 4, wherein when focusing is effected, the lens component in said second lens unit that is closest to the image side is fixed, and all the remainder of said lens components in said second lens unit are movable.

10. A zoom lens system comprising:
    a positive lens unit;
    a negative lens unit disposed on an object side of said positive lens unit; and
    a negative lens unit disposed on an image side of said positive lens unit,
    wherein said zoom lens system is adapted to change a focal length of the zoom lens system by varying a space reserved between said positive and said negative lens units and said two negative lens units,
    said positive lens unit includes two lens components so that focusing is effected by varying axial spacing between said two lens components, and the axial spacing between said two lens components is kept constant during change in focal length of the zoom lens system,
    the negative lens unit disposed on the object side of said positive lens unit includes, in order from the object side, a negative meniscus lens having a convex surface directed toward the object side, and a positive meniscus lens having a convex surface directed toward the object side,
    the negative lens unit disposed on the image side of said positive lens unit includes, in order from the object side, a positive meniscus lens having a convex surface directed toward the image side, and a negative meniscus lens having a convex surface directed toward the image side, and
    a distance from a most object side lens surface of the entire system to an image plane is substantially constant for any zoom position.

11. A zoom lens system according to claim 10, wherein one of said two lens components is disposed on the object side of the other, the lens component on the object side has a positive refractive power, and focusing at a short object distance is effected by increasing the axial spacing between said lens components.

12. A zoom lens system according to claim 10, wherein when focusing is effected, the lens component in said second lens unit that is closest to the image side is fixed, and all the remainder of said lens components in said second lens unit are movable.

13. A zoom lens system comprising first, second and third lens units and being adapted to change a focal length of the entire system by varying a space reserved between said first and second and said second and third lens units, wherein said first lens unit includes, in order from an object side, a negative meniscus lens having a convex surface directed toward the object side and a positive meniscus lens having a convex surface directed toward the object side, the second lens unit, which is disposed between said first and third lens units, has at least two lens components, a space reserved between the lens component in said second lens unit that is closest to an image side of the zoom lens system and at least one other of said lens components is variable for focusing but the spacing is fixed when said focal length of the zoom lens system is changed, said third lens unit includes, in order from the object side, a positive meniscus lens having a convex surface directed toward the image side and a negative meniscus lens having a convex surface directed toward the image side, said second lens unit has a positive power, and said first and third lens units each have a negative power, and a distance from a most object side lens surface of the entire system to an image plane is substantially constant for any zoom position.

14. A zoom lens system according to claim 13, wherein when focusing is effected at a short object distance, the lens component in said second lens unit that is closest to the image side is fixed, and all the remainder of said lens components are movable toward the object side.

15. A zoom lens system according to claim 13, which satisfies the following condition;

$$|\phi_{LF}/\phi_2|<1.0 \tag{1}$$

where $\phi_{LF}$ is power of the lens component in said second lens unit that is closest to the image side, and $\phi_2$ is the power of said second lens unit.

16. A zoom lens system according to claim 13, wherein the lens component in said 2-nd lens unit that is the closest to the image side is formed from a meniscus lens having a convex surface directed toward the image side.

17. A zoom lens system according to claim 13, wherein a lens unit disposed on the object side of said second lens unit includes a negative and a positive lens each having a convex surface directed toward the object side, and a lens unit disposed on the image side of said second lens unit is movable during zooming and includes a positive and a negative lens each having a convex surface directed toward the image side.

* * * * *